United States Patent Office 3,555,092
Patented Jan. 12, 1971

3,555,092
CYCLOALKYL N-[OCTOHYDRO - 1,2,4-METHANO-PENTALENYL-(5)]OXIME-CARBAMATES
Claus Dieter Weis, Arlesheim, Basel-Land, and Karl Gatzi, Basel, Switzerland, assignors to Geigy Chemical Corporation, Ardsley, N.Y., a corporation of New York
No Drawing. Filed Dec. 18, 1967, Ser. No. 691,135
Claims priority, application Switzerland, Dec. 22, 1966, 18,373/66
Int. Cl. C07c *131/02*
U.S. Cl. 260—566                          4 Claims

ABSTRACT OF THE DISCLOSURE

Certain oxime N-[octahydro-1,2,4-methenopentalenyl-(5)]-carbamates are disclosed as fungicides; compositions containing these carbamates as fungicidal agents and methods of controlling fungi therewith are also described.

DESCRIPTION OF THE INVENTION

The present invention concerns new oximes acylated by the radical of an N-substituted carbamic acid, processes for the production thereof, also fungicidal compositions which contain the new oximes as active substances, processes for combatting phytopathogenic fungi using the new active substances or compositions containing these active substances.

α-Halogen oximes acylated by N-substituted carbamic acid radicals are known from German Pat. No. 1,156,781 for the combatting of phytopathogenic fungi. Such acylated oximes can also be termed as oxime esters of carbamic acids.

The new acylated oximes according to the present invention correspond to general Formula I

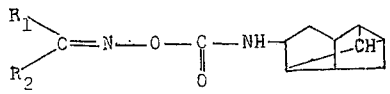

(I)

wherein $R_1$ represents hydrogen or a lower alkyl radical,
$R_2$ represents an unsubstituted or substituted aliphatic, araliphatic, aromatic or heterocyclic radical, or
$R_1$ and $R_2$ together with the adjacent C atom also represent a cycloaliphatic ring system.

These new oximes have excellent fungicidal properties and are active against numerous phytopathogenic fungi. The new active substances are also valuable for the treatment of seeds, the germination of which is not influenced thereby.

In addition, the new compounds also act as systemic fungicides. Due to these properties, plants treated therewith are given a wider and more protracted protection from attack by fungi.

The acylated oximes of general Formula I are produced according to the invention by reacting octahydro-1,2,4-methenopentalenyl-(5)-isocyanate of Formula II

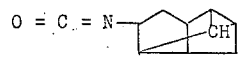

(II)

with an oxime of the general Formula III

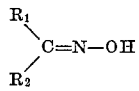

(III)

wherein $R_1$ and $R_2$ have the meanings given in Formula

I, the reaction being performed, if necessary, in the presence of an agent promoting the addition.

Acylated oximes of general Formula I are also obtained by an analogous process by reacting the octahydro-1,2,4-methenopentalenyl-(5)-amine in the presence of a condensing agent, with phosgene and an oxime of the general Formula III. According to a variation of this process, an oxime of general Formula III is reacted first with phosgene to form the corresponding chloroformic acid compound and then this is reacted with the octahydro-1,2,4-methenopentalenyl-(5)-amine. The protection of this amine is described in copending patent application Ser. No. 691,200, filed of even date herewith.

The process according to the invention and the variations thereof are preferably performed in a solvent which is inert to the reaction components. Suitable solvents are, e.g.: hydrocarbons, such as benzene, toluene, xylenes, ether and ether-type compounds such as diethyl ether, dioxane, tetrahydrofuran, diethylene glycol monomethyl ether, chlorinated hydrocarbons such as methylene chloride etc.

In general, the addition reaction of the isocyanate to the oxime is performed without an agent to promote the addition. In some cases, however, it is advantageous to perform the addition in the presence of a base, e.g. in the presence of a tertiary organic base such as a trialkylamine, pyridine etc. On the other hand, for the modified process—the reaction amine/phosgene/oxime—the presence of an inorganic or organic base is necessary. Examples of inorganic bases are: an alkali metal hydroxide, acetate, hydrogen carbonate, carbonate or phosphate, and examples of organic bases are: a tertiary amine such as a trialkylamine, pyridine, collidine etc.

In Formula I, $R_1$, as lower alkyl radical, has 1 to 6, preferably 1 to 4, carbon atoms. It represents, e.g. the methyl, ethyl, a propyl, butyl, amyl or hexyl radical. An aliphatic hydrocarbon radical $R_2$ is an alkyl, alkenyl and cycloalkyl radical. Such an alkyl or alkenyl radical can have at most 18 carbon atoms, cycloaliphatic radicals $R_2$ which may be substituted by halogen of an atomic number of at most 35 can also be polycyclic radicals. By an aromatic radical $R_2$, preferably a mononuclear ring system is to be understood; this is, thus, chiefly the phenyl radical which can be unsubstituted or mono- or poly-substituted. As substituents of the phenyl radical can be mentioned halogen atoms of an atomic number of at most 35, hydroxyl, mercapto, nitro, acyl, alkyl, alkoxy or alkylthio grfoups. Aliphatic hydrocarbon radicals $R_2$ can be substituted by halogen atoms of an atomic number of at most 35, hydroxyl, mercapto, acyl, alkoxy or alkylthio groups. In the case of poly-substitution, the substituents can be identical or different ones. Thiophene, furane and pyridine radicals may be mentioned as examples of heterocyclic radicals $R_2$. The unsubstituted or a substituted benzyl or phenylethyl radical can be mentioned as examples of araliphatic radicals $R_2$. The symbols $R_1$ and $R_2$ make up a cycloaliphatic ring system having 4 to 12, preferably 5 to 9 ring members, which ring can be mono- or polynuclear, saturated or olefinically unsaturated.

Aldoximes and ketoximes serve as starting materials of the general Formula III, for example, oximes of the following aldehydes and ketones: acetone, methylethyl ketone, dibutyl ketone, dihexyl ketone, 1,1-dimethoxy-3-butanone, 1-chloro-3-pentanone, 3-octanone, heptylmethyl ketone, acetophenone, benzylethyl ketone, propiophenone, butyrophenone, benzaldehyde, p-anisaldehyde, cinnamaldehyde, halogen benzaldehyde, nitrobenzaldehyde, vanillin, pyridine aldehydes, furfural, isobutyraldehyde, 2,6-dimethyl-5-hepten-1-al, 10-undecanal, enanthaldehyde, cyclopentanone, cyclohexanone, cycloheptanone, cyclo-octanone, cyclododecanone, camphor, 7-halogen-bicyclo-(3.2.0)-heptanone-(6), etc.

Both octahydro-1,2,4-methenopentalenyl-(5)-isocyanate and octahydro-1,2,4-methenopentalenyl-(5)-amine have not been known hitherto. These compounds, which serve as intermediate products, are obtained by degrading functional reactive derivatives of octahydro-1,2,4-methenopentalenyl-(5)-carboxylic acid in the known way according to Curtius or Hofmann to the isocyanate or amine. Reactive functional derivatives of these carboxylic acids which can be used are the azide and the amide.

The starting isocyanate is produced, preferably, by Curtius degradation of the azide. For this purpose, either the carboxylic acid is converted into the carboxylic acid chloride which is then reacted with alkali metal azide to form the desired carboxylic acid azide, or one of the alkyl esters such as the methyl or ethyl ester is converted into the carboxylic acid azide with hydrazine hydrate and nitrous acid, preferably in the presence of a solvent or diluent. The azide is converted into the isocyanate by thermic decomposition in a solvent which is inert to the reaction components such as in an aromatic hydrocarbon such as benzene, toluene, xylenes, or in a higher boiling ether such as dioxane. The temperature for the decomposition of the azide lies between 20 and 180° C.

The isocyanate is converted into the octahydro-1,2,4-methenopentalenyl-(5)-amine by reacting it either (a) with glacial acetic acid and acetic acid anhydride or (b) with an alkanol. In the former case (a), the acetylamine is obtained as reaction product which is converted into the free amine by alkaline saponification. In case (b), the carbamic acid esters corresponding to the alkanols used are obtained which can be converted by acid as well as basic hydrolysis into the amine mentioned. Hydrohalic acids, glacial acetic acid, halogenated acetic acids or mixtures of such acids can be used for acid hydrolysis; alkali metal and alkaline earth metal hydroxides for example are suitable for basic hydrolysis. The hydrolysis can be performed both in water as well as in an alkanol such as methanol and ethanol or in diethylene glycol etc.

In addition, octahydro-1,2,4-methenopentalenyl-(5)-amine can be obtained by acid amide degradation according to Hofmann. For this purpose, the corresponding carboxylic acid amide is heated, e.g. in the presence of an agent giving off bromine or chlorine in the presence of an alkali metal or alkaline earth metal hydroxide or an acid. Both water as well as an alkanol are suitable as solvent, but in cases where the degradation is performed in an alkanol, e.g. methanol or ethanol, the corresponding alcoholates are used instead of the hydroxides mentioned.

Particularly preferred on account of their good fungicidal activity are oxime carbamates according to the invention which fall under Formula I, and in which $R_1$ represents hydrogen or lower alkyl; and $R_2$ represents a lower alkyl group or a lower alkenyl group any substituents of which lower alkyl and lower alkenyl groups are selected from lower alkoxy and phenyl, or a phenyl radical any substituents of which are selected from chlorine, hydroxy and lower alkoxy; or furyl; or pyridyl; or $R_1$ and $R_2$ taken together represent polymethylene of from 3 to 11 carbon atoms, or, together with the carbon atom to which they are linked the divalent camphor radical of the formula

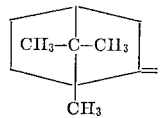

"lower" in connection with "alkyl," "alkenyl" and "alkoxy" meaning that such group has not more than 4 carbon atoms.

In another aspect, the invention provides a process for controlling phytopathogenic fungi, especially in cultivated crops. For this purpose, and taking into account the type of crop to be protected, e.g. planted fields or groves of fruit trees, etc., as well as differences in regional climatic conditions, application of from about 1000 to 2000 liters of a liquid, sprayable composition having a content of 0.1% of an active compound according to the invention per hectare, or proportionally lesser amounts in case compositions such as powders having higher concentrations of active substance are recommended in field crops, and about 10 to 50 liters of the liquid, sprayable compositions having the said content of active substance may be required for a full-grown fruit tree of average size.

The following examples illustrate the production of the new oxime carbamates of general Formula I. Where not expressly stated otherwise, parts and percentages are given by weight and the temperatures in degrees centigrade.

EXAMPLE 1

Production of the starting material (a) 164 parts of the known octahydro-1,2,4-methenopentalenyl-(5)-carboxylic acid [cf. H. K. Hall, J. Org. Chem. 25, 42 (1960)], 1000 parts by volume of benzene and 4 parts by volume of pyridine are gently heated on a steam bath. 250 parts of thionyl chloride are added dropwise within 15 minutes in such a way that the reaction proceeds by itself with $SO_2$ development. On completion of the addition of the thionyl chloride, the whole is heated for another 15 minutes on the steam bath, after which all volatile products are removed at room temperature by water jet vacuum. 200 aprts by volume of petroleum ether are added to the residue, the mixture is left to stand for 30 minutes and then filtered. The solvent is removed in the evaporator. The octahydro-1,2,4-methenopentalenyl-(5)-carboxylic acid chloride obtained is distilled; it boils at 63–65°/torr. (Yield: 162.7 parts; 88.5%.)

(b) 93.6 parts of sodium azide are dissolved in 1720 parts by volume of 50% aqueous acetone and the solution is cooled to 0°. 90 parts of the octahydro-1,2,4-methenopentalenyl-(5)-carboxylic acid chloride obtained according to (a) are then added within 5–10 minutes. The temperature in the reaction vessel is kept at 0–2° by exterior cooling. On completion of the addition, the whole is stirred at 0° for another 50 minutes, after which the solution is extracted, first with 1000 parts by volume of ice cold benzene and then a second time with 300 parts by volume of ice cold benzene. The combined benzene extracts are then dried with finely pulverised calcium chloride at 0–5°. The calcium chloride is filtered off and the filtrate is heated for 2½ hours in a steam bath. Nitrogen is developed and the solution foams. The benzene is then distilled off. The octahydro-1,2,4-methenopentalenyl-(5)-isocyanate boils at 70–75°/3 torr.

Production of an oxime according to the invention (c) 7.5 parts of octahydro-1,2,4-methenopentalenyl-(5)-isocyanate and 5.3 parts of cyclohexanone oxime are added to 25 parts by volume of tetrahydrofuran. After 12 hours, the solvent is removed and the residue is distilled. The O - [octahydro - 1,2,4 - methenopentalenyl - (5)-carbamoyl]-cyclohexanone oxime boils at 132–145°/0.07 torr.

EXAMPLE 2

Example 1 is repeated but in lieu of the octahydro-1,2,4-methenopentalenyl-(5)-carboxylic acid produced as described by Hall, supra, there is used the same acid produced by saponification from its ethyl ester, obtained by the process of Schrauzer et al. [Chem. Berichte 97, 2451 (1964)].

For this purpose, 288 g. of ethyl octahydro-1,2,4-methenopentalenyl-(5)-carboxylate are dissolved in a mixture of 75 g. of sodium hydroxide, 850 ml. of water and 250 ml. of ethanol, and the whole is boiled under reflux 6 hours. The solution is then concentrated to a volume of 600 ml., and acidified with 250 ml. of concentrated hydrochloric acid. An oil layer forms which is separated from the aqueous phase and then mixed with 500 ml. of diethyl ether. The aqueous phase is extracted twice with each time 100 ml. of diethyl ether. The combined ether solutions are then washed with water and dried over anhydrous sodium sulfate. The ether solvent is then evaporated and the residue distilled under vacuum. The fraction boiling at 103–105° under 0.3 torr is the free octahydro-1,2,4-methenopentalenyl-(5)-carboxylic acid. It is obtained in an amount of 199.1 g. (82% yield rate).

When using this acid as starting material in Example 1 and otherwise repeating the entire procedure of that example, O - [octahydro-1,2,4-methenopentalenyl-(5)-carbamoyl]-cyclohexanone oxime of the boiling range given in Example 1 is obtained. It has good fungicidal activity.

EXAMPLE 3

254 parts of cycloheptanone oxime are dissolved in 1000 parts by volume of tetrahydrofuran and 322 parts of octahydro-1,2,4-methenopentalenyl-(5)-isocyanate are so added dropwise that the temperature does not rise above 35°. After standing for 12 hours at 25°, volatile parts are removed in vacuo at 40–50°/15 torr and the residue is distilled under high vacuum. The O-[octahydro-1,2,4 - methenopentalenyl - (5) - carbamoyl] - cycloheptanone oxime boils at 110–130°/0.04 torr.

EXAMPLE 4

7.1 parts of octahydro-1,2,4-methenopentalenyl-(5)-isocyanate in 25 parts by volume of tetrahydrofuran are reacted with 6.1 parts of cyclo-octanone oxime. The solvent is removed after 12 hours. Distillation yields 7.8 parts (59%). The O-[octahydro-1,2,4-methenopentalenyl-(5)-carbamoyl]-cyclo-octanone oxime boils at 85–100°/0.04 torr.

The following octahydro-1,2,4-methenopentalenyl-(5)-carbamoyl oximes are produced by the methods described in the above examples from equimolar amounts of octahydro-1,2,4-methenopentalenyl-(5)-isocyanate and the corresponding ketoximes and aldoximes:

O - [octahydro - 1,2,4 - methenopentalenyl - (5) - carbamoyl]-allyl-methylketone oxime;
O - [octahydro - 1,2,4 - methenopentalenyl - (5) - carbamoyl]-vinyl-methylketone oxime;
O-[octahydro-1,2,4-methenopentalenyl-(5)-carbamoyl]-acetone oxime, B.P. 81–90° C./0.2. torr;
O-[octahydro-1,2,4-methenopentalenyl-(5)-carbamoyl]-methylethyl ketone oxime, M.P. 62–63° C./0.02 torr;
O-[octahydro-1,2,4-methenopentalenyl-(5)-carbamoyl]-dibutyl ketone oxime, B.P. 121–129° C./0.02 torr;
O-[octahydro-1,2,4-methenopentalenyl-(5)-carbamoyl]-1,1-dimethoxybutanone oxime;
O-[octahydro-1,2,4-methenopentalenyl-(5)-carbamoyl]-acetophenone oxime, B.P. 118–125° C./0.02 torr;
O-[octahydro-1,2,4-methenopentalenyl-(5)-carbamoyl]-benzylethyl ketone oxime; B.P. 135–146° C./0.02 torr;
O-[octahydro-1,2,4-methenopentalenyl-(5)-carbamoyl]-propiophenone oxime, B.P. 120° C./0.01 torr (molecular distillation);
O-[octahydro-1,2,4-methenopentalenyl-(5)-carbamoyl]-benzaldehyde oxime;
O-[octahydro-1,2,4-methenopentalenyl-(5)-carbamoyl]-cinnamaldehyde oxime, gelatinous mass;
O-[octahydro-1,2,4-methenopentalenyl-(5)-carbamoyl]-vanillin oxime;
O-[octahydro-1,2,4-methenopentalenyl-(5)-carbamoyl]-4-pyridine aldehyde oxime;
O-[octahydro-1,2,4-methenopentalenyl-(5)-carbamoyl]-furfural oxime;
O-[octahydro-1,2,4-methenopentalenyl-(5)-carbamoyl]-cyclopentanone oxime, M.P. 65–67° C.;
O-[octahydro-1,2,4-methenopentalenyl-(5)-carbamoyl]-cyclododecanone oxime;
O-[octahydro-1,2,4-methenopentalenyl-(5)-carbamoyl]-camphor oxime;
O-[octahydro-1,2,4-methenopentalenyl-(5)-carbamoyl]-3',4'-dichloro-acetophenone oxime.

The fungicidal compositions according to the invention are produced in the known way by intimately mixing and milling active substances of general Formula I with suitable carriers, optionally with the addition of dispersing agents or solvents which are inert to the active substances. The active substances can be present and used in dusts, sprinkling agents, granulates, coated granules, impregnated granules, homogeneous granules; wettable powders, pastes, emulsions; solutions and aerosols.

The concentration of active substance in these agents is, e.g. 0.01 to 80%.

Other biocidal active substances or compositions can be admixed with the fungicidal compositions according to the invention. Thus, the new compositions, in addition to the compounds mentioned of general Formula I, can contain, e.g., insecticides, other fungicides, bactericides, fungistatica, bacteriostatica or nematocides to widen the range of action. The compositions according to the invention can also contain synthetic fertilisers, trace elements etc.

The following examples serves to illustrate the application part of the present invention; where not otherwise stated, parts mean parts by weight.

DUSTS

To produce (a) a 1% and (b) a 5% dust, the following components are used:

(a)

| | Parts |
|---|---|
| Cyclohexanone oxime N-[octahydro - 1,2,4 - methenopentalenyl-(5)]-carbamate | 1 |
| Sodium aluminium silicate | 5 |
| Magnesium carbonate | 2 |
| Talcum | 92 |

(b)

| | Parts |
|---|---|
| Cycloheptanone oxime N -[octahydro-1,2,3-methenopentalenyl-(5)]-carbamate | 5 |
| Sodium aluminium silicate | 10 |
| Magnesium carbonate | 2 |
| Talcum | 83 |

The active substances mentioned above are intimately mixed and milled with the carriers. The fungicidal dust so obtained serve for the treatment of soil in seed beds or for dusting plants.

SEED DRESSINGS

To produce (a) a 10% and (b) a 60% seed dressing, the following components are used:

(a)

| | Parts |
|---|---|
| Cyclopentanone oxime N - [octahydro-1,2,4-methenopentalenyl-(5)]-carbamate | 10 |
| Kieselguhr | 5 |
| Liquid paraffin | 1 |
| Talcum | 84 |

(b)

| | Parts |
|---|---|
| Benzaldehyde oxime N-[octahydro - 1,2,4 - methenopentalenyl-(5)]-carbamate | 60 |
| Kieselguhr | 15 |
| Liquid paraffin | 1 |
| Talcum | 24 |

The active substances mentioned are mixed intimately in a mixer with the carriers listed and the paraffin as distributing agent, and then milled. The pulverulent seed dressings obtained serve for the treatment of seeds of all types.

GRANULATES

The following components are used to produce (a) a 2.5% and (b) a 5% granulate:

(a)

| | Parts |
|---|---|
| N - [octahydro - 1,2,4 - methenopentalenyl - (5)-carbamoyl] acetone oxime | 2.5 |
| Kieselguhr | 2.5 |
| Polyethylene glycol | 5 |
| Ground limestone (0.4–0.8 mm. diameter) | 89.3 |
| Silicic acid | 0.7 |

(b)

| | Parts |
|---|---|
| O - [octahydro - 1,2,4 - methenopentalenyl - (5)-carbamoyl]-acetophenone oxime | 5 |
| Kieselguhr | 1.5 |
| Cetyl polyglycol ether | 0.5 |
| Ground limestone | 87 |
| Polyethylene glycol | 5 |
| Silicic acid | 1 |

The ground limestone in each case is impregnated with the polyethylene glycol or with the cetyl polyglycol ether and then mixed with a mixture consisting of the active substance given, the silicic acid and the kieselguhr. These granulates are particularly suitable for the disinfection of soil in seed beds.

WETTABLE POWDERS

The following components are used to produce (a) a 10% and (b) a 25% wettable powder:

(a)

| | Parts |
|---|---|
| O - [octahydro - 1,2,4 - methenopentalenyl-(5)-carbamoyl]-cyclohexanone oxime | 10 |
| Sodium aluminum silicate | 25 |
| Champagne chalk | 30 |
| Lignin sulphonic acid sodium salt | 10 |
| Nonylphenyl polyethylene glycol ether | 2 |
| A polyvinyl alcohol/Champagne chalk mixture 1:1 | 2 |
| Magnesium carbonate | 2 |
| Kaolin | 19 |

(b)

| | Parts |
|---|---|
| O - [octahydro - 1,2,4 - methenopentalenyl - (5)-carbamoyl]-cycloheptanone oxime | 25 |
| Sodium aluminum silicate | 35 |
| Oleoyl methyl tauride sodium salt | 5 |
| Champagne chalk | 30 |
| A naphthalene sulphonic acid/phenol sulphonic acid/formaldehyde condensation product | 5 |

The active substances given are drawn onto the carriers and then mixed and milled with the additives listed. Wettable powders having excellent wettability and suspendibility are obtained. Suspensions of any concentration desired can be obtained from such wettable powders by dilution with water. Such suspensions serve for the treatment of cultivated plants.

EMULSION CONCENTRATE

To produce 50% emulsion concentrates, the following components are used:

(a)

| | Parts |
|---|---|
| O-[octahydro - 1,2,4 - methenopentalenyl - (5) - carbamoyl]-cyclo-octanone oxime | 50 |
| Xylene | 45 |
| A combined emulsifyer consisting of the calcium salt of dodecylbenzene sulphonic acid and an alkylaryl polyglycol ether (e.g. "Emullat P 140 HFP," produced by Union Chimique Belge S.A. Brussels) | 5 |

(b)

| | Parts |
|---|---|
| O-[octahydro - 1,2,4 - methenopentalenyl - (5) - carbamoyl]-cycloheptanone oxime | 50 |
| Petroleum distillate (boiling range 185–215°) | 45 |
| Iso-octylphenoxy polyethylene glycol | 5 |

The active substance in each case is dissolved in the xylene or petroleum distillate and then the combined emulsifyers are added to these solutions. Emulsion concentrates are obtained which can be diluted with water to any concentration desired. Such emulsions are suitable for the treatment of cultivated plants.

The fungicidal action of the octahydro 1,2,4-methenopentalenes usable according to the invention has been tested on:

(1) *Botrytis cinerea* on beans (*Vicia faba*)
(2) *Erysiphe cichoracearum* on potted cucumber plants (*Cucumis sativus*)
(3) *Uromyces appendiculatus* on beans (*Phaseolus vulgaris*)

These tests are carried out as follows:

(1) *Botrytis cinerea* on beans (*Vicia faba*)

Petri dishes are lined with moist filter paper and in each dish three freshly cut bean leaves (*Vicia faba*) are placed upper side downwards. The leaves are then sprayed with a 0.1% aqueous suspension of active substance. After the spray coating has dried, the leaves are infested with a fresh suspension of spores of *Botrytis cinerea*. The dishes are covered and left to stand for 1–2 days at room temperature. The test is then evaluated as follows:

0 = no growth of fungi
1–9 = graduated strength of attack, culminating in
10 = total infestation (corresponding to the control plants).

The following results were obtained:

| Compound: | Strength of attack |
|---|---|
| O - [octahydro - 1,2,4 - methenopentalenyl - (5)-carbamoyl]-cycloheptanone-oxime | 3 |
| O - [octahydro - 1,2,4 - methenopentalenyl - (5)-carbamoyl]-cyclopentanone-oxime | 2 |

(2) *Erysiphe cichoracearum* on potted cucumber plants (*Cucumis sativus*)

Leaves of potted cucumber plants are sprayed with a 0.1% aqueous suspension of active substance. After the spray coating has dried, the leaves are sprayed with a fresh suspension of spores of *Erysiphe cichoracearum* after which they are put in a moist chamber for 1 day and then placed in a green-house. After about 7 days, the test was evaluated as follows:

0 = no attack by fungi
1–9 = graduated strength of attack, culminating in
10 = total infestation (corresponding to the control plants).

The following results were obtained:

| Compound: | Strength of attack |
|---|---|
| O - [octahydro - 1,2,4-methenopentalenyl - (5)-carbamoyl]-cycloheptanone-oxime | 4 |
| O - [octahydro - 1,2,4 - methenopentalenyl - (5)-carbamoyl]-cyclo-octanone-oxime | 3 |
| O-[octahydro - 1,2,4 - methenopentalenyl - (5)-carbamoyl]-di-n-butylketone-oxime | 0 |

(3) *Uromyces appendiculatus* on beans (*Phaseolus vulgaris*)

Leaves of bean plants (*Phaseolus vulgaris*) in the two-leaf stage were sprayed with an aqueous suspension containing 0.1% of active substance.

The suspension is obtained from the 10% wettable powder described as form for application above, by diluting with water. After drying, the leaves are infested with a fresh suspension of spores of *Uromyces appendiculatus*. The plants are then left for one day in a moist room and then kept in a greenhouse. After about 7 to 10 days the test is evaluated as follows:

0 = no attack by fungi
1–9 = graduated strength of attack, culminating in
10 = total infestation (corresponding to the control plants).

The following results were obtained:

| Compound: | Strength of attack |
|---|---|
| O-[octahydro - 1,2,4 - methenopentalenyl - (5)- carbamoyl]-cycloheptanone-oxime | 5 |
| O - [octahydro - 1,2,4 - methenopentalenyl - (5)- carbamoyl]-cyclopentanone-oxime | 0 |

We claim:
1. A compound of the formula

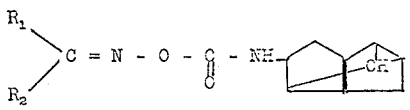

wherein $R_1$ and $R_2$ together represents polymethylene of from 4 to 11 carbon atoms.

2. A compound as defined in claim 1, which is
O - [octahydro-1,2,4-methenopentalenyl - (5) - carbamoyl]-cyclopentanone oxime.

3. A compound as defined in claim 1, which is
O - [octahydro-1,2,4-methenopentalenyl - (5) - carbamoyl]-cyclohexanone oxime.

4. A compound as defined in claim 1, which is
O - [octahydro-1,2,4-methenopentalenyl - (5) - carbamoyl]-cycloheptanone oxime.

References Cited

UNITED STATES PATENTS

| 3,231,599 | 1/1966 | Kilsheimer et al. | 260—464 |
| 3,256,330 | 6/1966 | Kilsheimer et al. | 260—566 |
| 3,400,153 | 9/1968 | Payne et al. | 260—566 |

LEON ZITVER, Primary Examiner

G. A. SCHWARTZ, Assistant Examiner

U.S. Cl. X.R.

260—295, 347.3, 453, 563; 424—327, 263, 285